United States Patent
Kim et al.

(10) Patent No.: US 8,365,073 B2
(45) Date of Patent: Jan. 29, 2013

(54) APPARATUS AND METHOD FOR DISPLAYING DOCUMENT

(75) Inventors: Myung-jae Kim, Suwon-si (KR); Ki-hong Park, Seoul (KR); Jeong-ho Nho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 12/766,587

(22) Filed: Apr. 23, 2010

(65) Prior Publication Data

US 2011/0010617 A1    Jan. 13, 2011

(30) Foreign Application Priority Data

Jul. 7, 2009    (KR) .................. 10-2009-0061731

(51) Int. Cl.
*G06F 17/00* (2006.01)
(52) U.S. Cl. ......... 715/273; 715/230; 715/839; 715/863
(58) Field of Classification Search .................. 715/273, 715/764–796; 345/619–620, 156
See application file for complete search history.

(56) References Cited

U.S. PATENT DOCUMENTS

| | | | |
|---|---|---|---|
| 5,926,567 A | 7/1999 | Collins et al. | |
| 5,943,679 A | 8/1999 | Niles et al. | |
| 2007/0180355 A1* | 8/2007 | McCall et al. | 715/501.1 |
| 2010/0245375 A1* | 9/2010 | Rhodes | 345/589 |

OTHER PUBLICATIONS

European Search Report, issued Jun. 8, 2011, in counterpart Application No. 10167843.1, entire document.

* cited by examiner

*Primary Examiner* — Cesar Paula
*Assistant Examiner* — Quoc A Tran
(74) *Attorney, Agent, or Firm* — Sughrue Mion, PLLC

(57) ABSTRACT

Provided are an apparatus and method for displaying a document, the document display apparatus including an image processor which displays a document including a plurality of pages; a memory unit which stores individual unit elements constituting the document and image data including the individual unit elements; and a controller which controls the image processor to generate the image data corresponding to at least one page estimated to be turned to among the plurality of pages, store the image data in the memory unit, and display the image data corresponding to a requested page among the stored image data when a user requests a page transition. With this, the page transition speed may be improved through image caching.

25 Claims, 16 Drawing Sheets

FIG. 3A

| SPEED OPTIMIZING STEPS | Master Page (ONLY PPT FILE) | OBJECT CATEGORY 1 |
|---|---|---|
| Very Fast | Off | ALL DELETE |
| Fast | Off | 3N DELETE |
| Nomal | Off | 2N DELETE |
| Slow | On | N DELETE |
| Very Slow | On | ALL DISPLAY |

FIG. 4B

| MEMORY MAP | |
|---|---|
| Address | Page Number |
| 0 | N - 2 |
| 1 | N + 3 |
| 2 | N - 3 |
| 3 | N + 4 |
| 4 | N - 4 |
| 5 | N + 5 |
| 6 | N - 5 |
| 7 | N |
| 8 | N + 1 |
| 9 | N - 1 |
| 10 | N + 2 |

FIG. 5A

| MOVE PAGE : N + 20<br>GENERATE PAGE NUMBER TO MAKE CACHE | Update Flag |
|---|---|
| N + 20 | 1 |
| N + 21 | 1 |
| N + 19 | 1 |
| N + 22 | 1 |
| N + 18 | 1 |
| N + 23 | 1 |
| N + 17 | 1 |
| N + 24 | 1 |
| N + 16 | 1 |
| N + 25 | 1 |
| N + 15 | 1 |

FIG. 5B

| MEMORY MAP | | Update Flag |
|---|---|---|
| Address | Page Number | |
| 0 | N - 2 | 1 |
| 1 | N + 3 | 1 |
| 2 | N - 3 | 1 |
| 3 | N + 4 | 1 |
| 4 | N - 4 | 1 |
| 5 | N + 5 | 1 |
| 6 | N - 5 | 1 |
| 7 | N | 1 |
| 8 | N + 1 | 1 |
| 9 | N - 1 | 1 |
| 10 | N + 2 | 1 |

FIG. 5C

| UPDATED MEMORY MAP ||
|---|---|
| Address | Page Number |
| 0 | N + 18 |
| 1 | N + 23 |
| 2 | N + 17 |
| 3 | N + 24 |
| 4 | N + 16 |
| 5 | N + 25 |
| 6 | N + 15 |
| 7 | N + 20 |
| 8 | N + 21 |
| 9 | N + 19 |
| 10 | N + 22 |

FIG. 6A

| MOVE PAGE : N + 7 | |
|---|---|
| GENERATE PAGE NUMBER TO MAKE CACHE | Update Flag |
| N + 7 | 1 |
| N + 8 | 1 |
| N + 6 | 1 |
| N + 9 | 1 |
| N + 5 | 0 |
| N + 10 | 1 |
| N + 4 | 0 |
| N + 11 | 1 |
| N + 3 | 0 |
| N + 12 | 1 |
| N + 2 | 0 |

FIG. 6B

| MEMORY MAP | | Update Flag |
|---|---|---|
| Address | Page Number | |
| 0 | N - 2 | 1 |
| 1 | N + 3 | 0 |
| 2 | N - 3 | 1 |
| 3 | N + 4 | 0 |
| 4 | N - 4 | 1 |
| 5 | N + 5 | 0 |
| 6 | N - 5 | 1 |
| 7 | N | 1 |
| 8 | N + 1 | 1 |
| 9 | N - 1 | 1 |
| 10 | N + 2 | 0 |

FIG. 6C

| Address | Page Number |
|---------|-------------|
| \<colspan=2\>UPDATED MEMORY MAP | |
| 0 | N + 9 |
| 1 | N + 3 |
| 2 | N + 10 |
| 3 | N + 4 |
| 4 | N + 11 |
| 5 | N + 5 |
| 6 | N + 12 |
| 7 | N + 7 |
| 8 | N + 8 |
| 9 | N + 6 |
| 10 | N + 2 |

FIG. 7A

| MOVE PAGE : N + 20 | |
|---|---|
| GENERATE PAGE NUMBER TO MAKE CACHE | Update Flag |
| N + 20 | 1 |
| N + 21 | 1 |
| N + 19 | 1 |
| N + 22 | 1 |
| N + 18 | 1 |
| N + 23 | 1 |
| N + 24 | 1 |
| N + 25 | 1 |
| N + 26 | 1 |
| N + 27 | 1 |
| N + 28 | 1 | a PART: rows N+20 through N+18 b PART: rows N+23 through N+28

FIG. 7B

| MEMORY MAP | | Update Flag |
|---|---|---|
| Address | Page Number | |
| 0 | N - 2 | 1 |
| 1 | N + 3 | 1 |
| 2 | N - 3 | 1 |
| 3 | N + 4 | 1 |
| 4 | N - 4 | 1 |
| 5 | N + 5 | 1 |
| 6 | N - 5 | 1 |
| 7 | N | 1 |
| 8 | N + 1 | 1 |
| 9 | N - 1 | 1 |
| 10 | N + 2 | 1 |

FIG. 7C

| Address | Page Number |
|---|---|
| \multicolumn{2}{|c|}{UPDATED MEMORY MAP} |
| 0 | N + 18 |
| 1 | N + 23 |
| 2 | N + 24 |
| 3 | N + 25 |
| 4 | N + 26 |
| 5 | N + 27 |
| 6 | N + 28 |
| 7 | N + 20 |
| 8 | N + 21 |
| 9 | N + 19 |
| 10 | N + 22 |

APPARATUS AND METHOD FOR DISPLAYING DOCUMENT

CROSS-REFERENCE TO RELATED APPLICATION

This application claims priority from Korean Patent Application No. 10-2009-0061731, filed on Jul. 7, 2009 in the Korean Intellectual Property Office, the disclosure of which is incorporated herein by reference.

BACKGROUND OF INVENTION

1. Field of Invention

Exemplary embodiments consistent with the present invention relate to an apparatus and method for displaying a document, and more particularly to an apparatus and method for displaying a document, which may improve a page transition speed through image caching.

2. Description of the Related Art

To directly open document files without conversion in a display apparatus, a function of a document viewer has been widely used. Also, a document viewer may be installed in general personal computer (PC) environments and open the document files without installing a document editor.

Recently, an embedded environment of a portable device such as a mobile terminal, a personal digital assistant (PDA), a portable multimedia player (PMP), etc. has tended to utilize a document viewer having the same function as those of the PC environment. Also, an electronic device such as a digital television (TV), a projector, a camcorder, a camera, etc. may require a document viewer.

The performance of the document viewer varies depending on the embedded environment. For example, while a central processing unit (CPU) may maintain the same performance, the performance of the document viewer, i.e., a page transition speed, may become lowered as an output resolution of a display apparatus increases. Since the existing portable devices may support low display resolutions of, for example, 320*240, 480*320, 800*400, etc., such devices may be less restricted by the performance of the document viewer, when using such low display resolutions. However, digital TVs may support a full high definition (HD) of 1920*1080, and there are projectors of various specifications that support resolutions of, for example, 1024*768, 1280*1024 and full HD. Thus, if a document viewer is installed in such a high resolution product, the page transition speed may be considerably lowered. Accordingly, there is required an apparatus and method for displaying document files at high resolutions and improving the performance of the document viewer by enhancing the page transition speed.

SUMMARY OF THE INVENTION

Exemplary aspects of the present invention provide an apparatus and method for displaying a document, in which a page transition speed may be improved by image caching.

The foregoing and/or other aspects of the present invention may be achieved by providing a document display apparatus comprising an image processor which displays a document comprising a plurality of pages; a memory unit which stores individual unit elements constituting the document and image data comprising the individual unit elements; and a controller which controls the image processor to generate the image data corresponding to at least one page estimated to be turned to among the plurality of pages, store the image data in the memory unit, and display the image data corresponding to a page among the stored image data when a user requests a page transition.

The controller may control the image processor to generate and display the image data corresponding to the requested page if the image data corresponding to the requested page is not stored in the memory unit.

The controller may control the image processor to generate the image data as a page unit.

The controller may control the image processor to generate the image data by stepwise excluding the individual unit elements having a low priority, as a page transition speed becomes faster.

The controller may control the image processor to give a priority to the individual unit elements according to effects on delivering meanings of the document or based on a user's selection.

The controller may control the image processor to sequentially generate the image data in order of neighboring a currently displayed page, so that the image data are alternately generated in both directions of a subsequent page and a previous page with respect to the current displayed page.

The controller may control the image processor to sequentially generate the image data in order of neighboring a currently displayed page, so that the image data are alternately generated in both directions of a subsequent page and a previous page with respect to the current displayed page within a predetermined range and the image data are sequentially generated in a direction of the subsequent page with respect to the currently displayed page beyond the predetermined range.

The controller may generate the image data and a memory map for mapping a location where the image data is stored, and stores the image data and the memory map in the memory unit.

The controller may control the image processor to generate the image data while excluding the previously stored image data by referring to the memory map, if turning to the requested page.

The controller may update the memory map to correspond to the image data generated in order of neighboring the requested page, if turning to the requested page.

Another aspect of the present invention can be achieved by providing a document display method comprising: generating image data corresponding to at least one page estimated to be turned to among a plurality of pages included in a document; storing the generated image data; and displaying the image data corresponding to a requested page among the previously stored image data if a user requests a page transition.

The document display method may further comprise generating and displaying the image data corresponding to the requested page if the image data corresponding to the requested page is not stored in the memory unit.

The document display method may further comprise generating the image data as a page unit.

The document display method may further comprise generating the image date by stepwise excluding the individual unit elements having a low priority, as a page transition speed becomes faster.

The document display method may further comprise giving a priority to the individual unit elements according to effects on delivering meanings of the document or based on a user's selection.

The document display method may further comprise generating the image data in order of neighboring a current displayed page, so that the image data are alternately generated in both directions of a subsequent page and previous page with respect to the currently displayed page.

The document display method may further comprise sequentially generating the image data in order of neighboring a currently displayed page, so that the image data are alternately generated in both directions of a subsequent page and a previous page with respect to the currently displayed page within a predetermined range and the image data is sequentially generated in a direction of the next page with respect to the currently displayed page beyond the predetermined range.

The document display method may further comprise generating and storing the image data and a memory map for mapping a location where the image data is stored.

The document display method may further comprise generating the image data while excluding the previously stored image data by referring to the memory map, if turning to the requested page.

The document display method may further comprise updating the memory map to correspond to the image data generated in order of neighboring the requested page, if turning to the requested page.

BRIEF DESCRIPTION OF THE DRAWINGS

The above and/or other aspects of the present invention will become apparent from the following description of exemplary embodiments, taken in conjunction with the accompanying drawings, in which:

FIG. 3A is exemplary selection items for a page turning speed function according to an exemplary embodiment of the present invention;

FIG. 4B is an exemplary embodiment of a memory map;

FIGS. 5A to 5C are exemplary views of a process of updating a memory map, according to an exemplary embodiment of the present invention;

FIGS. 6A to 6C are exemplary views of a process of updating a memory map, according to another exemplary embodiment of the present invention; and FIGS. 7A to 7C are exemplary views of a process of updating a memory map according to another exemplary embodiment of the present invention.

DETAILED DESCRIPTION OF EXEMPLARY EMBODIMENTS OF THE INVENTION

Figure 1:
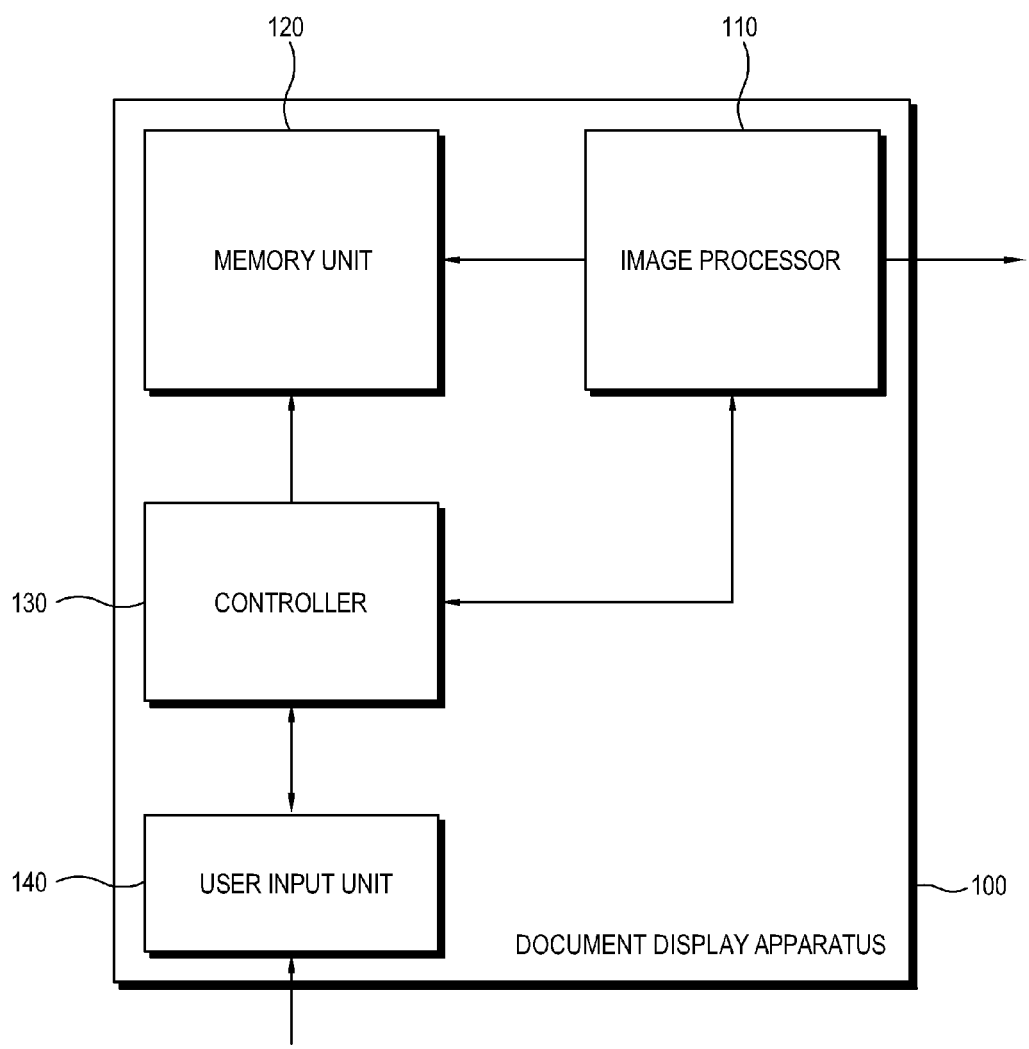
FIG. 1 is a configuration of a document display apparatus according to an exemplary embodiment of the present invention.

Exemplary embodiments of the present invention will now be described in detail with reference to the accompanying drawings so as to be easily realized by a person having ordinary knowledge in the art. The present invention may be embodied in various forms without being limited to the exemplary embodiments set forth herein. Descriptions of well-known parts are omitted for clarity, and like reference numerals refer to like elements throughout.

FIG. 1 is a configuration of a document display apparatus according to an exemplary embodiment of the present invention.

A document display apparatus 100 in this embodiment may be achieved by a projector, a digital TV, a PC, etc. Further, an electronic device may be used as the document display apparatus 100, according to the present embodiment, if it has a document viewer function capable of directly opening a document file without conversion.

The document display apparatus 100 in this embodiment may include an image processor 110, a memory unit 120, a controller 130, and a user input unit 140.

The image processor 110 may process and display a document that includes a plurality of pages. In this case, the document may be provided in the form of a document file having an extension format such as *.DOC, *.PPT, *.XLS, *.PDF, *.HWP, *.TXT, *.HTML, etc.

Specifically, the image processor 110 receives and parses a document file in order to analyze information about the kinds, positions, etc. of individual unit elements that constitute the document. According to an exemplary embodiment, the individual unit element may be an object. Individual elements may include, for example, a text box, a picture box, a diagram, a word art, a VISIO object, a table, a chart, etc.

The image processor 110 may perform a pretreatment operation, e.g., parsing the analyzed individual unit elements, giving priority to them, etc. In this case, the image processor 110 stores the abstracted individual unit elements in the memory unit 120 to be described later.

Then, the image processor 110 performs a page rendering to display one page from the abstracted individual unit elements as an image, and generates image data by abstracting RGB data for a screen output from the rendering result. In this case, the image processor 110 stores the generated image data in the memory unit 120.

Meanwhile, the image processor 110 may include a liquid crystal display (LCD), an organic light emitting diode (OLED), a plasma display panel (PDP), etc.

The memory unit 120 may store the individual unit elements constituting the document, and may store image data which includes the individual unit elements.

The memory unit 120 may be partitioned into a plurality of regions or include a plurality of memories, which will be described in more detail with reference to FIGS. 2A and 2B.

To improve a page transition speed, the document display apparatus 100 may perform object caching that abstracts and stores objects. In the case of turning to a page having the cached objects, the page transition speed may be improved by utilizing the cached objects and thereby omitting a process previous to the object caching. Although there may be a difference in the page transition speed according to contents of the document, the object caching may improve the page transition speed, such as, for example, by about 5 seconds if it takes 10 seconds to turn a page without the object caching.

However, the page transition speed may not be uniform, and may vary depending on the content of the document. Additionally, because a user may expect that a page is turned within about 2 seconds of an associated command to turn the page, object caching alone may not improve page transition speed sufficiently.

Among the various operations of the document viewer, it may take the most time to generate image data of a page. Thus, in the exemplary embodiments of the present invention, image caching may be employed to improve the page transition speed. With image caching, a page transition may be achieved, for example, within about 2 seconds, regardless of the contents of the document.

That is, the document display apparatus 100 may generate and stores image data as a page unit. The operations of generating and storing the image data may be repetitively performed during an idle time, such as a time during which other operations are not performed (e.g., a page transition is not performed). Then, when turning to a page, if it is determined that a requested page is an image-cached page, the document display apparatus 100 may display the image data of the stored corresponding page directly on a screen. Thus, by using image caching, a series of operations from parsing the document to generating the image data may be omitted among the operations performed for outputting the document, and this may allow the page transition speed to increase. Time taken in turning a page may be equal to time taken in displaying the image data on the screen, and embodiments in accordance with aspects of the present invention may therefore, by image caching, keep a page transition speed constant.

The controller 130 may control the image processor 110 to generate the image data corresponding to at least one page estimated to be turned to among a plurality of pages and store it in the memory unit 120. In this case, the controller 130 may control the image processor 110 to generate the image data as a page unit.

According to an exemplary embodiment, the controller 130 may control the image processor 110 to sequentially generate the image data in order of neighboring the current displayed page, so that the image data can be sequentially generated in both directions of the previous and next pages with respect to the currently displayed page.

According to another exemplary embodiment, the controller 130 may control the image processor 110 to sequentially generate the image data in order of neighboring the current displayed page, so that the image data can be sequentially generated in both directions of the previous and next pages with respect to the currently displayed page within a predetermined range, and the image data can be sequentially generated in the direction of the next page with respect to the currently displayed page beyond the predetermined range.

If a user requests a page transition, the controller 130 may control the image processor 110 to display the image data corresponding to the requested page among the previously stored image data. If the image data corresponding to the requested page is not stored in the memory unit 120, the controller 130 may control the image processor 110 to generate the image data corresponding to the requested page and display it.

According to an exemplary embodiment, the controller 130 may control the image processor 110 to generate the image data by stepwise abstracting or excluding the individual unit elements having a low priority, as a page transition speed increases. In this case, the controller 130 may control the image processor 110 to give the priority to the individual unit elements according to effects on delivering meanings of the document or based on a user's selection. For example, in one exemplary embodiment, blocks of text may be of lower priority than pictures, and pictures may be of lower priority than headings. Thus, the controller 130 may control the image processor 110 to generate the image data by abstracting or excluding blocks of text, and, if the page transition speed increases further, the controller 130 may control the image processor 110 to generate the image data by abstracting or excluding pictures, in addition to blocks of text, in accordance to the exemplary embodiment.

Alternatively, according to another exemplary embodiment, a user's selection may be, for example, for the image processor 110 to generate the image data by stepwise abstracting or excluding blocks of text and abstracting or excluding headings, if pictures have a greater effect on delivering meaning of the document, according to the user's selection.

By giving priority to the individual unit elements according to effects on delivering meaning of the document or based on a user's selection, the meaning of an element, a page, or a document may be understood even when individual elements with a low priority are abstracted or excluded.

According to another exemplary embodiment, the controller 130 may generate the image data and a memory map for mapping a location where the image data is stored, and then store the image data and the memory map in the memory unit 120. In this case, when turning to the requested page, the controller 130 may control the image processor 110 to generate image data that excludes the previously stored image data, by referring to the memory map. Further, when turning to a requested page, the controller 130 may update the memory map corresponding to the image data generated in order of distance from the requested page.

Through a user input unit 140, a user may input his/her selection. Specifically, the user's selection may be related to the priority given to the individual unit elements to be shown, or a priority of objects not to be shown in the document, based on a page transition speed.

Figure 2A:
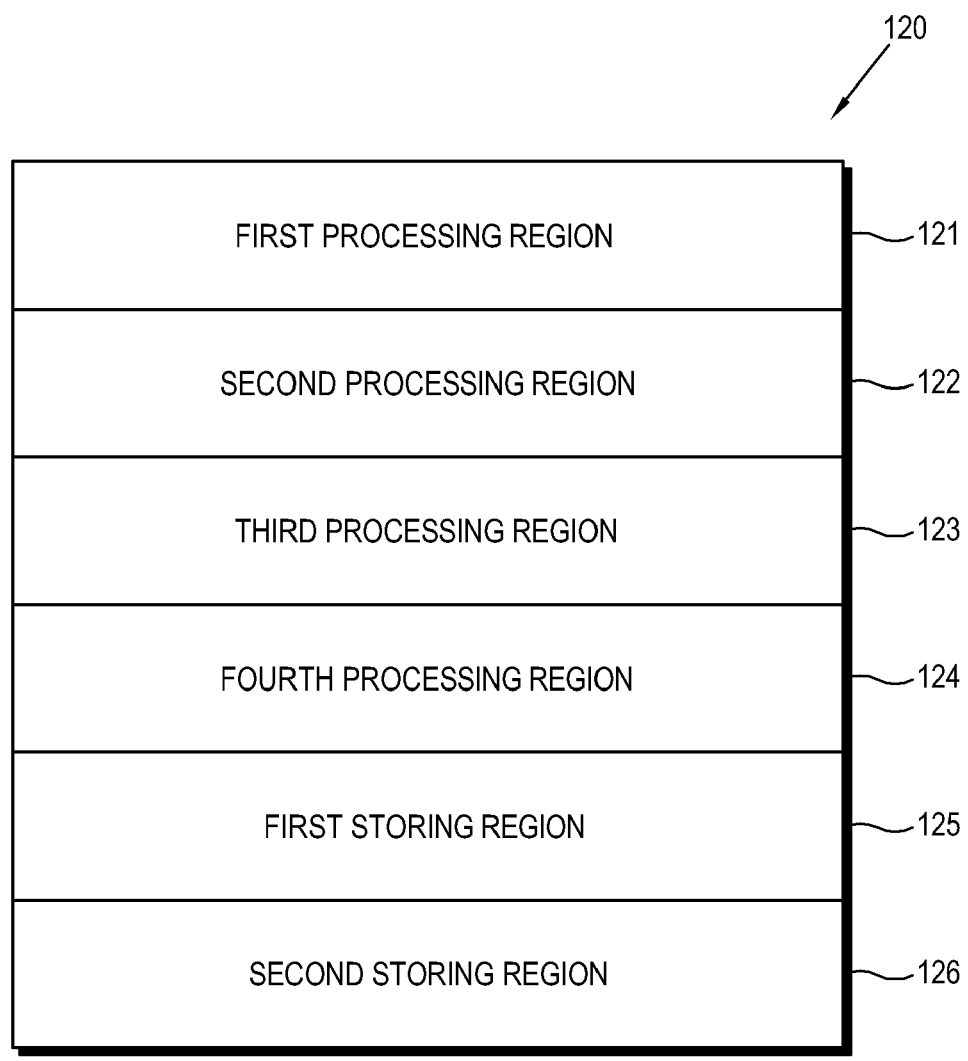
FIGS. 2A and 2B are exemplary embodiments of a memory unit.
Figure 2B:
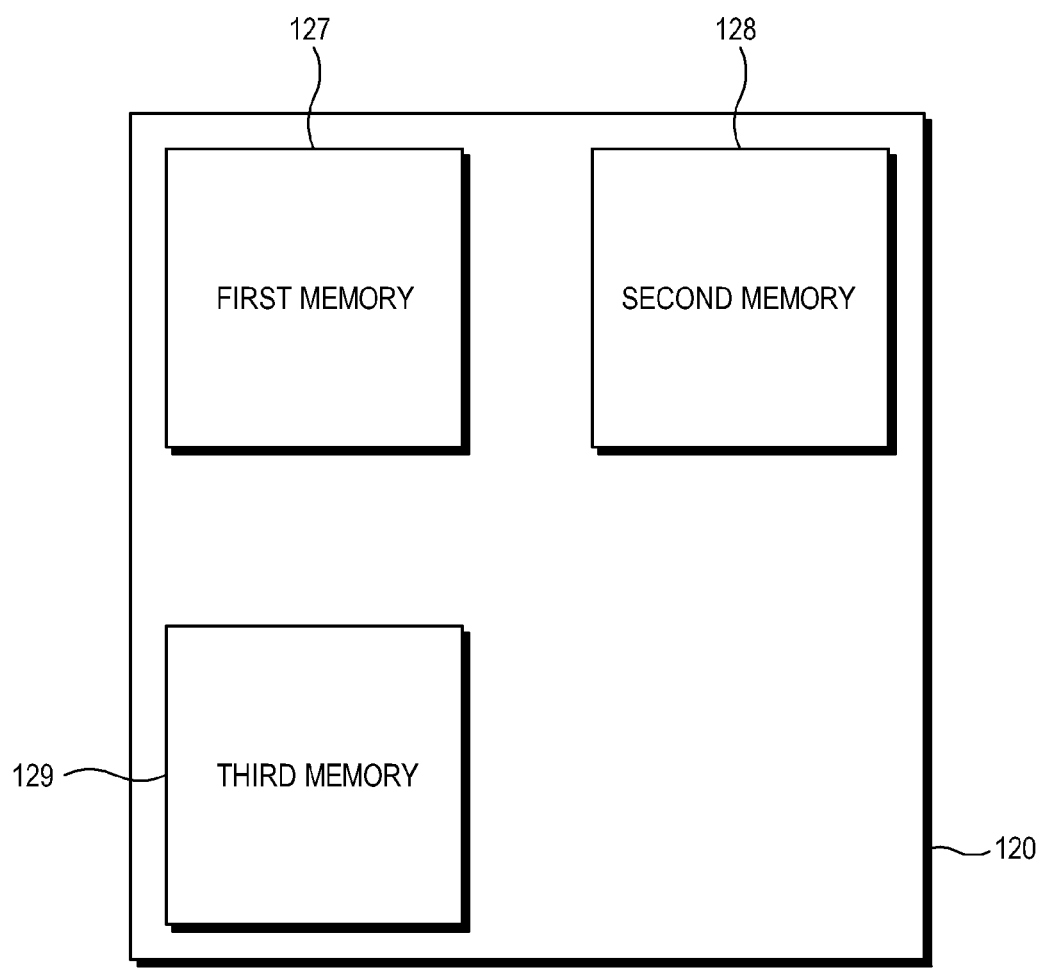

FIGS. 2A and 2B are exemplary embodiments of a memory unit.

In one embodiment, the memory unit 120 may be divided into a plurality of regions. As shown in FIG. 2A, the memory unit 120 may include a plurality of processing regions (a first processing region 121, a second processing region 122, a third processing region 123, and a fourth processing region 124, for example) where data is read and written for processing the document file, and may also include a plurality of storing regions (a first storing region 125 and a second storing region 126, for example) where processing results may be stored.

The first processing region 121 may be allocated to analyze the kinds, positions, etc. of the individual unit elements within the document. The second processing region 122 may be allocated to abstract the analyzed individual unit elements. The third processing region 123 may be allocated to perform a page rendering to display one page from the abstracted individual unit elements as an image. The fourth processing region 124 may be allocated to generate the image data by abstracting RGB data for a screen output from the rendering result.

Also, the first storage region 125 may store the individual unit elements abstracted by the second processing region 122. The second storage region 126 may store the image data generated by the fourth processing region 124. Here, the capacity of the image caching (the number of image data to be cached) may be increased by increasing the memory region allocated for the second storage region 126.

Alternatively, the memory unit 120 may include a plurality of memories. As shown in FIG. 2B, the memory unit 120 includes a first memory 127, a second memory 128 and a third memory 129.

The first memory 127 may process a document, that is, perform document parsing, object caching, page rendering, image data generation, etc.

The second memory 128 may store the individual unit elements constituting the document. The third memory 129 may store the image data containing the individual unit elements.

The memory unit 120 may, for example, be embodied as one or more volatile memory storage such as SDRAM and/or non-volatile storage such a NVRAM. Additionally, the memory unit 120 may include a computer readable recording media such as magnetic storage media, e.g., a hard disc, or optical recording media, e.g., DVD-RAM.

FIG. 3A shows selection items for a transition speed function according to an exemplary embodiment of the present invention.

Through the transition speed function according to an exemplary embodiment, individual unit elements not processed when generating the image data, or individual unit elements to be deleted may be manually selected. That is, the objects not to be processed are selected according to the kinds of the document, or at the request of a user, and may thereby improve the page transition speed.

The page transition speed may be associated with the number of objects constituting the image data. Specifically, if the number of objects in the document is decreased, it may be possible to reduce time taken for the object caching and the page rendering. To this end, the document display apparatus 100 may give priority to individual objects constituting the document in an order of each object having a lesser effect on delivering meaning, and may delete and/or not display objects having low priority, thereby decreasing the number of objects to be displayed. For example, in the case of a document having a Power Point format, a master page (background image) may not be displayed.

Further, the document display apparatus 100 may give the priority to the individual unit elements according to a user's selection, and may stepwise control the objects not to be displayed in order of priority according to the selection. Specifically, the priority may be given to the individual unit elements that belong to a certain category (e.g., a picture, a chart, etc.), and the number of individual unit elements to be deleted or not to be displayed according to a user's selection may be stepwise controlled.

Referring to FIG. 3A, an exemplary user selection menu may include whether or not the master page is displayed (i.e., off/on) and the number of objects not to be displayed (i.e., all delete/ 3N delete/ 2N delete/ N delete/ all display) among the objects belonging to an object category "1" are varied depending on transition speed steps (very fast/fast/normal/slow/very slow). For example, if a user selects "fast" among the transmission speeds, the master page and 3N objects having low priority among the objects belonging to the object category "1" may not be displayed to make the page transition speed fast.

Figure 3B:
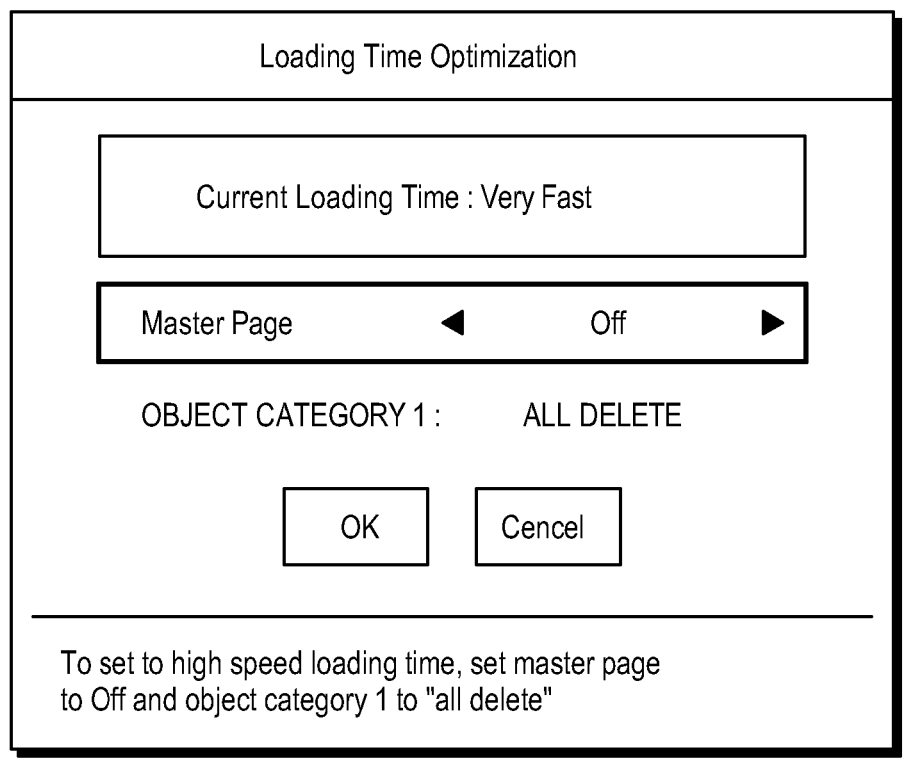
FIG. 3B is an exemplary menu screen displayed when the speed optimization function of FIG. 3A is selected, according to an exemplary embodiment.

FIG. 3B is an exemplary menu screen that may be displayed when the transition speed function of FIG. 3A is selected.

If a user selects the transition speed function in a menu item of the document display apparatus 100, a menu screen as shown in FIG. 3B may be displayed. In this case, a user may set up selection items according to the transition speed on the menu screen. Specifically, a user may set up an item of "current loading time" corresponding to the transition speed as one of the steps from "very fast" to "very slow." Here, whether the master page is set to be on or off and the number of objects not to be processed in the object category "1" may be automatically changed depending on speed step selected.

Figure 4A:
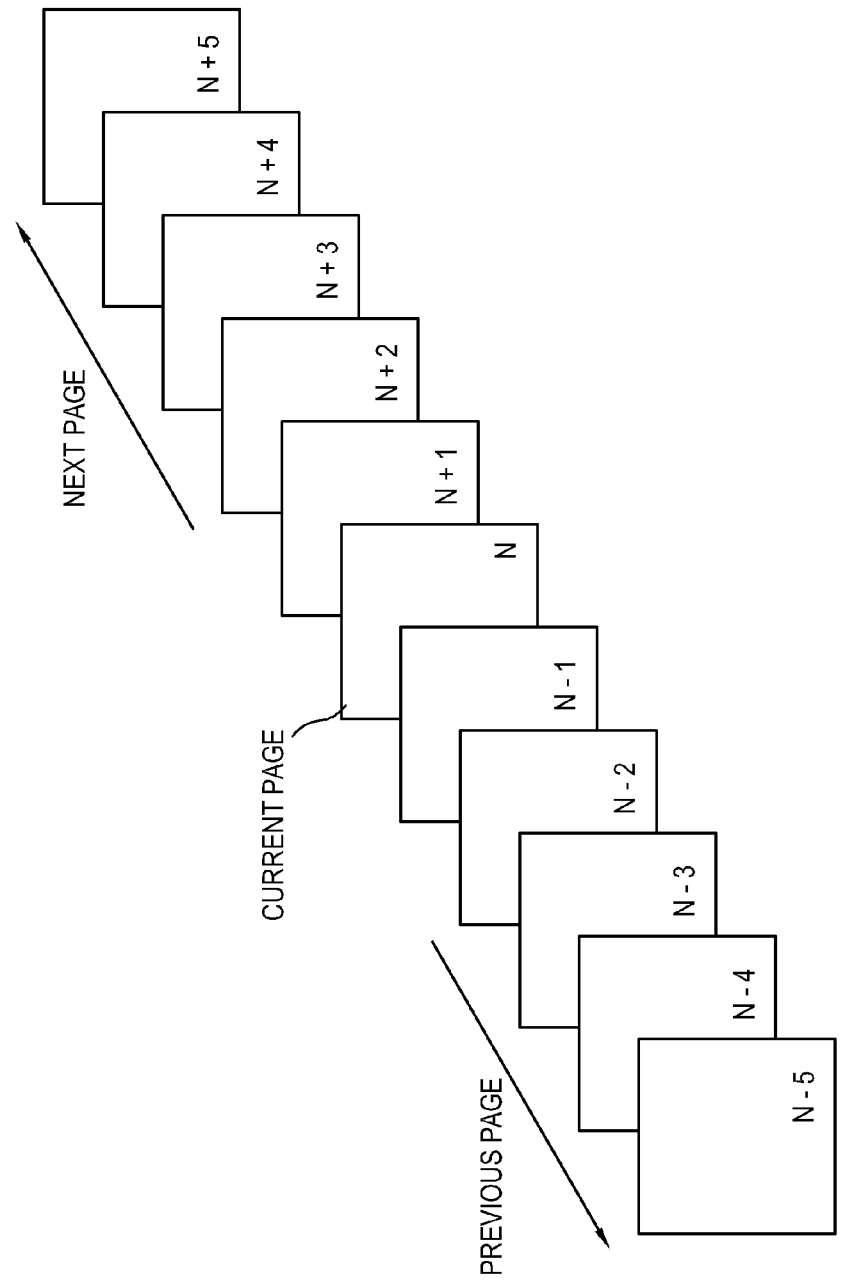
FIG. 4A is an exemplary page order of a document.

FIG. 4A is an exemplary page order of a document.

Assuming that the document display apparatus 100 currently displays an N page, the previous pages may be arranged in order of an N−1 page, an N−2 page, an N−3 page, an N−4 page and an N−5 page, and so forth, and the next pages may be arranged in order of an N+1 page, an N+2 page, an N+3 page, an N+4 page and an N+5 page, and so forth.

The closest neighboring pages to the N page are the N+1 page arranged next to the N page by one page, and the N−1 page arranged previously to the N page by one page. In this case, the N+1 page and the N−1 page are equally distant to the N page, and may therefore be hard to distinguish in priority. Since documents are generally read in direction of the subsequent page, exemplary embodiments may include that the N+1 page has higher priority than the N−1 page. Alternatively, the priority may be variously set up according to a user's selection.

The second closest neighboring pages to the N page are the N+2 page arranged subsequent to the N page by two pages and the N−2 page arranged previously to the N page by two pages. Thus, the neighboring pages to the N page may be arranged in order of priority as the N+1 page, the N−1 page, the N+2 page, the N−2 page, the N+3 page, the N−3 page, the N+4 page, the N−4 page, the N+5 page and the N−5 page, and so forth. Alternatively, according to another exemplary embodiment, the priority may be variously set according to a user's selection.

FIG. 4B shows an exemplary embodiment of a memory map.

According to another exemplary embodiment of the present invention, the document display apparatus 100 may create and store a memory map in a storage space in which the previously generated image data is cached.

The memory map may be used to perform mapping between the image data and the location where the image data is stored. Specifically, the memory map may be used to perform a mapping between an address corresponding to a storage space and a page number of corresponding image data stored in the storage space.

Supposing, for example, that there are eleven storage spaces to which addresses from "0" to "10" are assigned, in an exemplary embodiment. The document display apparatus 100, may, according to an exemplary embodiment, generate and store eleven image data. In this example, the generated image data may be sequentially stored in the storage spaces to which addresses are assigned, respectively, in order from the address of "0" to the address of "10."

The operation of generating the image data may be performed in an idle time, such as during when other operations are not performed. New image data may be generated in the order according to the storage space, up to the address of "10". In this case, the document display apparatus 100 may delete previously stored image data, and begin at the address of "0," and thereby store new generated image data in the storage spaces to which the addresses are assigned, respectively, in order from the address of "0" to the address of "10."

As shown in FIG. 4B, in the example, the N page being currently displayed and may be stored in the storage space to which the address of "7" is assigned. Further, the N+1 page, the N−1 page, the N+2 page, the N−2 page, the N+3 page, the N−3 page, the N+4 page, the N−4 page, the N+5 page and the N−5 page may be sequentially stored in order of distance from the N page.

Specifically, the N+1 page may be stored in the storage space to which the address of "8" is assigned, the N−1 page may be stored in the storage space to which the address of "9" is assigned, and the N+2 page is stored in the storage space to which the address of "10" is assigned. In this example, the address of "10" may be the last address of the memory map, so that the other pages may be stored by returning to the address of "0." That is, the N−2 page, the N+3 page, the N−3 page, the N+4 page, the N−4 page, the N+5 page and the N−5 page may be sequentially stored in the storage spaces to which the addresses are assigned, respectively, in order of the address of "0" to the address of "6."

FIGS. 5A to 5C are a process of updating a memory map according to an exemplary embodiment of the present invention.

In this embodiment, suppose that the page is turned to an N+20 page with respect to the foregoing case shown in FIG. 4B.

According to the an exemplary embodiment, the document display apparatus 100 sequentially generates the image data in order of neighboring the currently displayed page, in which the image data are generated in both directions of the previous and next pages with respect to the currently displayed page.

When moving to the N+20 page, the document display apparatus 100 generates the page numbers to be cached with respect to the N+20 page. Specifically, the document display apparatus 100 may sequentially generate the page numbers in order of neighboring the N+20 page. Referring to FIG. 5A, the pages undergo the image caching in order of the N+20 page, the N+21 page, the N+19 page, the N+22 page, the N+18 page, the N+23 page, the N+17 page, the N+24 page, the N+16 page, the N+25 page and the N+15 page.

The document display apparatus 100 may compare the page number to undergo the image caching with the page number currently stored in the memory map shown in FIG. 4B. In this case, the document display apparatus 100 ascertains whether there is any duplicate page, and sets up an update flag. The update flag is set up so as to allow the document display apparatus 100 to not duplicate image data previously stored in the memory map.

Among the page numbers to be image-cached, an update flag of "0" may beset for a page number being currently stored in the memory map, and an update flag of "1" may be set for a page number not currently stored in the memory map. In this case, the document display apparatus 100 does not generate the pages having the update flag of "0," but generates only the pages having the update flag of "1."

In a comparison between the page numbers of FIG. 5A to be image-cached and the page numbers of FIG. 4B previously stored, there are no duplicate page numbers. Thus, as shown in FIG. 5A, the update flag of "1" may be set so all the page numbers are to undergo image caching.

Among the page numbers being currently stored in the memory map, the document display apparatus 100 gives the update flag of "0" to the page numbers equal to the page numbers to undergo the image caching, and gives the update flag of "1" to the page numbers different from the page numbers to undergo the image caching. The document display apparatus 100 may delete the pages having the update flag of "1" among the previously stored pages without deleting the pages having the update flag of "0."

In the example, when the page numbers to undergo the image caching are compared with the previously stored page numbers shown in FIG. 4B, there are no duplicate page numbers. Thus, as shown in FIG. 5B, the update flag of "1" may be set for all the page numbers being currently stored in the memory map. In this case, the pages being currently stored in the memory map may all be updated.

FIG. 5C shows an exemplary memory map updated in such a manner.

The document display apparatus 100 may sequentially update the memory map in numerical order of the pages to be image-cached. Specifically, the document display apparatus 100 may update the N+20 page, to which the page is turned to, located at the address of "7" for the N page being currently displayed, and may update the N+21 page, the N+19 page and the N+22 page to be located at the addresses of "8," "9," and "10," respectively, in neighboring order of distance with respect to the address of "7" for the N+20 page.

In this case, the address of "10" is the last address of the memory map, so that the other pages may be updated by returning to the address of "0." That is, the N+18 page, the N+23 page, the N+17 page, the N+24 page, the N+16 page, the N+25 page and the N+15 page may be sequentially updated in the storage spaces to which the addresses are assigned, respectively, in order from the address of "0" to the address of "6."

FIGS. 6A to 6C are views for explaining a process of updating a memory map according to another exemplary embodiment of the present invention.

In this exemplary embodiment, the page is turned to an N+7 page with prior image data stored as in FIG. 4B.

When moving to the N+7 page, the document display apparatus 100 generates the page numbers to be cached with respect to the N+7 page. Specifically, the document display apparatus 100 may sequentially generate the page numbers in order of distance from the N+7 page. Referring to FIG. 6A, the pages may undergo the image caching in order of the N+7 page, the N+8 page, the N+6 page, the N+9 page, the N+5 page, the N+10 page, the N+4 page, the N+11 page, the N+3 page, the N+12 page and the N+2 page, for example.

The document display apparatus 100 may compare the page number to undergo the image caching with page numbers currently stored in the memory map, such as shown in FIG. 4B. The document display apparatus 100 may ascertain whether there are any pages that are currently cached and may not need to be generated, and thereby sets up an update flag.

In the comparison between the page numbers of FIG. 6A to be image-cached and the page numbers of FIG. 4B previously stored, there may be a duplicate page number. In this example, the N+5 page, the N+4 page, the N+3 page, and the N+2 page are duplicated. As shown in FIG. 6A, the update flag of "0" is set for the N+5 page, the N+4 page, the N+3 page and the N+2 page among the page numbers to undergo the image caching, and the update flag of "1" is set for the other pages. Thus, among the pages shown in FIG. 6A to undergo the image caching, the N+5 page, the N+4 page, the N+3 page and the N+2 page are not generated as they are previously cached, and the other pages are generated.

Meanwhile, the document display apparatus 100 may set the update flag for the page numbers being currently stored in the memory map.

If the page numbers to undergo the image caching are compared with the previously stored page numbers shown in FIG. 4B, the N+5 page, the N+4 page, the N+3 page and the N+2 page are duplicated. Thus, as shown in FIG. 6B, the update flag of "0" is set for the N+5 page, the N+4 page, the N+3 page and the N+2 page as page numbers currently stored in the memory map, and the update flag of "1" is set for the other pages. In this example, among the page numbers being currently stored in the memory map (referring to FIG. 6B), the N+5 page, the N+4 page, the N+3 page and the N+2 page are not updated, but only the other pages are updated.

FIG. 6C shows the memory map updated in such a manner.

The document display apparatus 100 may sequentially update the memory map in numerical order of the pages to be image-cached, and may not update the pages with the update flag of "0." In this exemplary embodiment, the document display apparatus 100 does not newly generate the N+2 page, the N+3 page, the N+4 page, and the N+5 page, as they are set with the update flag of "0". Additionally, the document display apparatus may not update the addresses of the memory map for these pages, in which the N+2 page, the N+3 page, the N+4 page, and the N+5 page are stored. In other words, the address of "10" storing the N+2 page, the address of "1" storing the N+3 page, the address of "3" storing the N+4 page, and the address of "5" storing the N+5 page may not be updated, in this exemplary embodiment.

The document display apparatus 100 may update the N+7 page, to which the page is turned, to be located at the address of "7" for the N page being currently displayed, and update the N+8 page and the N+6 page to be located at the addresses of "8" and "9," respectively, in neighboring order with respect to the address of "7" for the N+7 page. In this case, the address of "10" may not be updated, so that the previously stored N+2 page may be maintained without change. Accordingly, the N+9 page is updated to be located, not the address of "10", but the next available address of "0".

Meanwhile, as the address of "10" is the last address of the memory map, the document display apparatus 100 may return to the address of "0" and starts to update the other pages. The N+9 page may therefore be updated to be located at the address of "0." In this exemplary embodiment, the address of "1" is also not updated, and thus the N+10 page is updated to be located at the address of "2." Likewise, the N+11 page and the N+12 page are sequentially updated to be located at the address of "4" and the address of "6," respectively.

FIGS. 7A to 7C are views for explaining a process of updating a memory map according to another exemplary embodiment of the present invention.

In this exemplary embodiment, the page is turned to an N+20 page with respect to the foregoing case shown in FIG. 4B.

According to the present exemplary embodiment, the document display apparatus 100 may sequentially generate the image data in order of distance from the currently displayed page, image data may be sequentially generated in both directions of the previous and subsequent pages with respect to the currently displayed page within a predetermined range, and the image data may be sequentially generated in the direction of the subsequent page with respect to the currently displayed page beyond this predetermined range.

Referring to FIG. 7A, an "a" part shows a case that the image data is sequentially generated in both directions of the previous and subsequent pages with respect to the currently displayed page. In the case of the "a" part, the page numbers to undergo the image caching are generated in order of the N+20 page (currently displayed), the N+21 page, the N+19 page, the N+22 page, and the N+18 page. On the other hand, a "b" part shows a case that the image data is sequentially generated in the direction of only the subsequent page with respect to the currently displayed page. In the case of the "b" part, the page numbers to undergo the image caching may be generated in order of the N+23 page, the N+24 page, the N+25 page, the N+26 page, the N+27 page and the N+28 page. Thus, according to this exemplary embodiment, the pages to undergo the image caching may be in order of the N+20 page, the N+21 page, the N+19 page, the N+22 page, the N+18 page, the N+23 page, the N+24 page, the N+25 page, the N+26 page, the N+27 page and the N+28 page.

The document display apparatus 100 may compare the page number to undergo the image caching with the page number currently stored in the memory map, such as the memory map shown in FIG. 4B. In this case, the document display apparatus 100 ascertains whether there is any duplicate page, and may set an update flag. In, for example, a comparison between the page numbers of FIG. 7A to be image-cached and the page numbers of FIG. 4B previously stored, there are no duplicate page numbers. Thus, as shown in FIG. 7A, the update flag of "1" is set for all the page numbers to undergo the image caching.

The document display apparatus 100 may give an update flag to the page numbers being currently stored in the memory map. Page numbers to undergo image caching may be compared with previously stored page numbers, such as those shown in FIG. 4B, and if there are no duplicate page number, and the update flag may be set. Thus, for example, as shown in FIG. 7B, the update flag of "1" is set for all the page numbers being currently stored in the memory map. In this case, the pages being currently stored in the memory map may all be updated.

FIG. 7C shows the memory map updated in such a manner.

The document display apparatus 100 may sequentially update the memory map in numerical order of the pages to be image-cached. Specifically, the document display apparatus 100 may update the N+20 page, to which the page is turned, to be located at the address of "7" for the N page being currently displayed, and updates the N+21 page, the N+19 page and the N+22 page to be located at the addresses of "8," "9," and "10," respectively, in neighboring order with respect to the address of "7" for the N+20 page.

In this exemplary embodiment, as the address of "10" is the last address of the memory map, the other pages may be updated by returning to the address of "0." That is, the N+18 page, the N+23 page, the N+24 page, the N+25 page, the N+26 page, the N+27 page and the N+28 page may be sequentially updated in the storage spaces to which the addresses are assigned, respectively, in order from the address of "0" to the address of "6."

Exemplary embodiments of the present invention provide an apparatus and method for displaying a document, in which a page transition speed may be maintained regardless of contents of the document and a page may be turned within an acceptable period, such as with two seconds, for example.

Also, factors associated with the performance of a document viewer may be manually configured to improve the performance of the document viewer. Further, exemplary embodiments may provide a user interface to configure a page turning speed that a user finds acceptable.

Aspects of embodiments of the present invention may be embodied as computer programs and implemented on tangible computer readable recording medium. Examples of computer readable recording medium may include volatile, nonvolatile, magnetic, and optical storage media (e.g., EEPROM, ROM, RAM, floppy disc, hard disc, FLASH, CD-ROM, and DVD).

Although exemplary embodiments of the present invention have been shown and described, it will be appreciated by those skilled in the art that changes may be made in these embodiments without departing from the principles and spirit of the invention, the scope of which is defined in the appended claims and their equivalents. Additionally, expressions such as "at least one of", when preceding a list of elements, modify the entire list of elements and do not modify each element of the list.

What is claimed is:

1. A document display apparatus comprising:
   an image processor which displays a document having a plurality of pages;
   a memory unit which stores image data of the document; and
   a controller which controls the image processor to generate a first image data corresponding to at least one page estimated to be selected from among the plurality of pages of the document, store the generated first image data in the memory unit, and if a user requests a page transition and selects the estimated page of the document, controls the image processor to display the selected page of the document using the first image data stored in the memory unit, wherein the controller controls the image processor to sequentially generate the first image data in order of neighboring a currently displayed page, wherein the document comprises unit elements, wherein the controller controls the image processor to generate at least one of the first image data by stepwise excluding unit elements with a low priority, based on a page transition speed increase, and wherein the controller controls the image processor to prioritize the unit elements based on each element's effect on delivering meaning, or based on a user's selection.

2. The document display apparatus according to claim 1, wherein the controller controls the image processor to generate and display a second image data corresponding to the requested page if a first image data corresponding to the requested page is not stored in the memory unit.

3. The document display apparatus according to claim 1, wherein the controller controls the image processor to generate at least one of the first image data as a page unit.

4. The document display apparatus according to claim 1, wherein the first image data is alternately generated in directions of a subsequent page and a previous page with respect to the currently displayed page.

5. The document display apparatus according to claim 1, wherein the first image data is alternately generated in directions of a subsequent page and a previous page with respect to the currently displayed page, within a predetermined range, and the first image data is sequentially generated in the direction of the subsequent page, with respect to the current displayed page, beyond the predetermined range.

6. The document display apparatus according to claim 1, wherein the controller generates the first image data and a memory map for mapping a location where the first image data is stored, and stores the first image data and the memory map in the memory unit.

7. The document display apparatus according to claim 6, wherein the controller controls the image processor to generate the first image data while excluding a previously stored image data corresponding to the first image data, by referring to the memory map.

8. The document display apparatus according to claim 6, wherein the controller updates the memory map to correspond to the first image data generated in order of neighboring the requested page.

9. A document display method comprising:

generating first image data corresponding to at least one page estimated to be selected from among a plurality of pages of the document;

storing the generated first image data;

displaying a selected page of the document using the first image data stored in the memory unit, if a user requests a page transition and selects the estimated page of the document;

generating the first image data by stepwise excluding unit elements, included in the document, with a low priority, based on a page transition speed increase; and prioritizing the unit elements according to effects on delivering meaning of the document, or based on a user's selection, wherein the generating the first image data comprising, sequentially generating the first image data in order of neighboring a currently displayed page.

10. The document display method according to claim 9, further comprising generating and displaying a second image data corresponding to the requested page, if a first image data corresponding to the requested page is not stored.

11. The document display method according to claim 9, further comprising generating the first image data as a page unit.

12. The document display method according to claim 9, wherein the first image data is alternately generated in both directions of a subsequent page and a previous page, with respect to the currently displayed page.

13. The document display method according to claim 9, wherein the first image data is alternately generated in directions of a subsequent page and a previous page, with respect to the currently displayed page, within a predetermined range, and the first image data are sequentially generated in the direction of the subsequent page with respect to the currently displayed page, beyond the predetermined range.

14. The document display method according to claim 9, further comprising generating and storing the first image data and a memory map which maps a location where the first image data is stored.

15. The document display method according to claim 14, further comprising generating the first image data while excluding a previously stored image data corresponding to the first image data, by referring to the memory map.

16. The document display method according to claim 14, further comprising updating the memory map to correspond to the first image data generated in order of neighboring the requested page.

17. A document display apparatus comprising:

an image processor which selectively processes a document file comprising a plurality of pages, to generate a first image data corresponding to a current page;

a display unit which displays the first image data;

a controller which controls the image processor to selectively process the document file to generate a plurality of second image data corresponding to neighboring pages of the current page, in accordance with an estimated page turn of the current page, in order of neighboring the current page; and a memory unit which stores the plurality of second image data, wherein if a requested page turn corresponds to the estimated page turn of the current page, the controller controls the image processor to retrieve a one of the plurality of second image data corresponding to the estimated page turn and display the one of the plurality of second image data, as the requested page, wherein the document file comprises unit elements, wherein the controller controls the image processor to generate at least one of the second image data by stepwise excluding unit elements with a low priority, based on a page transition speed increase, and wherein the controller controls the image processor to prioritize the unit elements based on each element's effect on delivering meaning, or based on a user's selection.

18. The document display apparatus of claim 17, wherein the memory unit additionally stores a memory map, the memory map comprising a plurality of addresses corresponding to the plurality of second image data, and wherein a number of the plurality of second image data corresponds to neighboring pages of the current page, in accordance with an estimated page turn of the current page and the number of the plurality of addresses of stored image data.

19. The document display apparatus of claim 18, wherein if the requested page turn does not correspond to the estimated page turn of the current page, the controller controls the image processor to compare the plurality of second image data to an updated estimated page turn, and wherein the image processor, based on the comparison, generates updated image data in accordance with the updated estimated page turn, and selectively deletes second image data that is not in accordance with the updated estimated page turn.

20. The document display apparatus of claim 19, wherein, based on the comparison, the image processor updates the addresses of said memory map to correspond to the updated image data and the updated estimated page turn.

21. The document display apparatus of claim 18, wherein the controller controls the image processor to sequentially generate said second image data, in accordance with said estimated page turn and a number of the plurality of addresses of second image data, wherein said sequence is based on a page distance from the current page.

22. The document display apparatus of claim 18, wherein the controller controls the image processor to sequentially generate a predetermined number of second image data corresponding to neighboring pages of the current page, in accordance with said estimated page turn and a predetermined number of the plurality of addresses of second image data, said sequence based on a page distance from the current page, and wherein the controller controls the image processor to sequentially generate second image data corresponding to additional subsequent pages, in accordance with said estimated page turn and a remaining number of the plurality of addresses of second image data, said sequence based on a page distance from the current page.

23. The document display apparatus of claim 17, further comprising: a transition speed setting unit, wherein each of the plurality of pages of the document file comprises a plurality of image elements, and wherein, in accordance with a transition speed, the controller controls the image processor to generate the plurality of second image data by selectively abstracting or excluding at least one image element.

24. The document display apparatus of claim 23, wherein the selective abstracting or excluding of at least one image element is in accordance with a priority based on the effect of said image element on delivering meaning of the corresponding page of said image element.

25. The document display apparatus of claim 17, wherein said generation of the first image data corresponding to the current page comprises abstracting RGB data for a screen output.

* * * * *